United States Patent [19]

Motoyama et al.

[11] 4,420,216
[45] Dec. 13, 1983

[54] CONNECTING DEVICE

[75] Inventors: Kazuyasu Motoyama; Toshihiro Nakao; Mitsuo Nasu; Yoshio Tomizawa, all of Hachioji, Japan

[73] Assignee: Olympus Optical Company Limited, Tokyo, Japan

[21] Appl. No.: 292,039

[22] Filed: Aug. 11, 1981

[30] Foreign Application Priority Data

Aug. 13, 1980 [JP] Japan .................................. 55-111530

[51] Int. Cl.³ ............................................. H01R 13/06
[52] U.S. Cl. ................................................... 339/183
[58] Field of Search ................................. 339/182, 183

[56] References Cited

U.S. PATENT DOCUMENTS

| 1,565,263 | 12/1925 | Denny et al. | 339/183 |
| 2,399,402 | 4/1946 | Spengler | 339/182 R |
| 3,166,649 | 1/1965 | Frantz et al. | 339/182 R |
| 3,225,155 | 12/1965 | Duncan | 339/183 |
| 3,678,440 | 7/1972 | Gilsdorf | 339/183 |
| 4,295,694 | 10/1981 | Manning | 339/182 RS |

FOREIGN PATENT DOCUMENTS 242603  12/1960  Australia .............................. 339/183

Primary Examiner—Joseph H. McGlynn
Attorney, Agent, or Firm—Toren, McGeady and Stanger

[57] ABSTRACT

A connecting device for use in a tape recorder comprises a plug member arranged to be connected to an external load and includes a conductive sleeve, a conductive tip provided therein and a movable pin projecting at the end portion of the tip. The device also includes a jack member provided on a housing of an electrical apparatus, including a contact segment provided to contact with the sleeve of the plug tip, switching contact segments provided to separate from each other by action of the tip, and another contact segment provided to contact with the pin so as to supply source voltage to the external load through the pin of the plug member.

5 Claims, 8 Drawing Figures

CONNECTING DEVICE

BACKGROUND OF THE INVENTION

The present invention relates to a connecting device for use in a connecting of an external load which requires a power supply source.

In a tape recorder, for example, an external microphone is always utilized by connecting it to the tape recorder through a connecting device, instead of using a built-in microphone.

Conventional connecting devices include a plug member and a jack member as shown in FIG. 1 in which a plug member 1 has a sleeve 1a and a tip 1b. As shown in FIG. 2, the plug member 1 comprises the tip 1b, an insulator 1c provided therearound, the sleeve 1a provided therearound, lead wires 1e, 1f connected to the sleeve 1a and the tip 1b, respectively, and a pinch portion 1d for enveloping end portions of the sleeve, the tip, the insulator and lead wires therein. A jack member 2 comprises a contact segment 2a corresponding to the sleeve 1a of the plug member 1, and switching contact segments 2b, 2c corresponding to the tip 1b.

An external microphone 3 is connected between the sleeve 1a and the tip 1b of the plug member 1. The jack member 2 is provided on the housing of the tape recorder in such a manner that the contact segment 2a is connected to a built-in microphone 4 and to a ground, the contact segment 2b is connected to the microphone 4 and to a power supply source +Vcc through a resistor 5 and the contact segment 2c is connected to an amplifier 6. In such a connecting device, when the plug member 1 is inserted into the jack member 2 the switching contact segments 2b and 2c are disconnected so that the amplifier 6 is connected to the external microphone 3 instead of the built-in microphone 4.

A condenser or electrostatic microphone is generally utilized in a tape recorder so that the external microphone requires that a power supply source be connected to it, but in the above described connecting device it is impossible to directly supply the supply power to the external microphone 3 from the tape recorder. Then the external microphone 3 must have its own d.c. power supply source such as a battery 7.

Such connecting device has several disadvantages in that the external microphone has to be used by confirming the ON or OFF state of a power switch and the degree of power consumption of the battery resulting in troublesome operation, and the microphone becomes increased in weight resulting in complicated handling.

SUMMARY OF THE INVENTION

An object of the present invention is to eliminate the above described disadvantages of the conventional connecting device.

Another object of the present invention is to provide a connecting device capable of directly supplying the supply power of the tape recorder to the external load when the plug member is connected to the jack member.

According to the present invention there is provided a connecting device comprising a plug member connected to an external load and including a conductive sleeve, a conductive tip provided therein and a movable pin projected to the end portion of the tip. Also a jack member provided on a housing of an electrical apparatus includes a contact segment provided to contact with the sleeve of the plug tip, switching contact segments provided to separate from each other by action the tip, and another contact segment provided to contact with the pin to supply source voltage to the external load through the pin of the plug member.

The plug member comprises a hollow cylindrical conductive tip, a hollow cylindrical insulator provided in the tip and having a cavity at one end portion thereof, and a movable conductive pin biased by a spring provided in the cavity so as to short-circuit the tip and the pin with each other.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts, and wherein;

FIG. 5b is a transverse sectional view of the jack member shown in FIG. 5a;

DESCRIPTION OF THE PREFERRED EMBODIMENT

Figure 1:
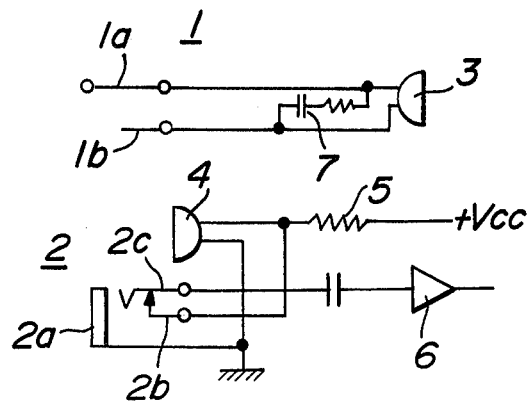
FIG. 1 is a circuit diagram showing one embodiment of a conventional connecting device.
Figure 2:
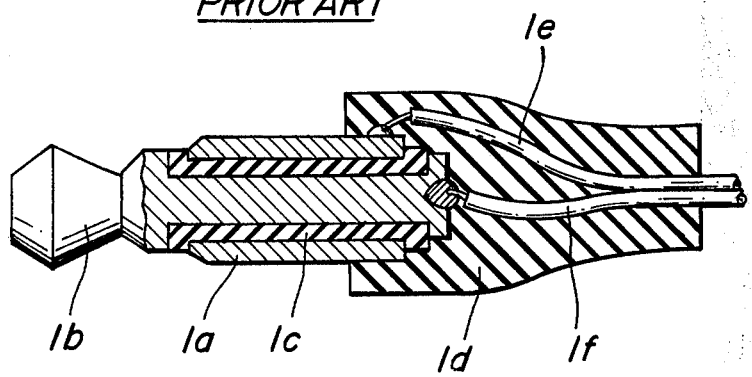
FIG. 2 is a vertical section view illustrating a plug member of the connecting device shown in FIG. 1.

Referring now to the drawings, there is shown an embodiment of a connecting device according to the present invention.

Figure 3:
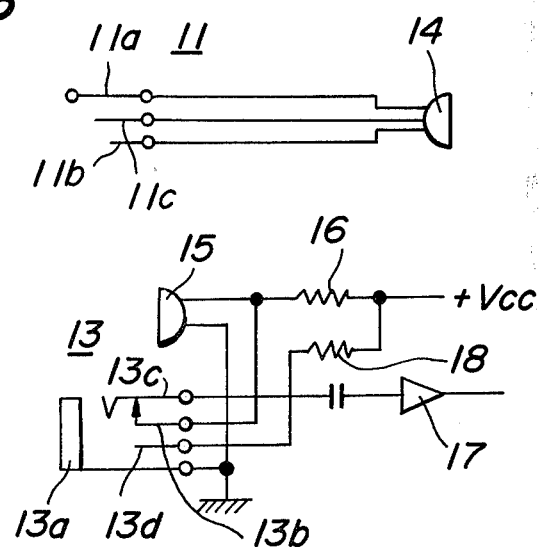
FIG. 3 is a circuit diagram showing one embodiment of a connecting device according to the present invention.
Figure 4:
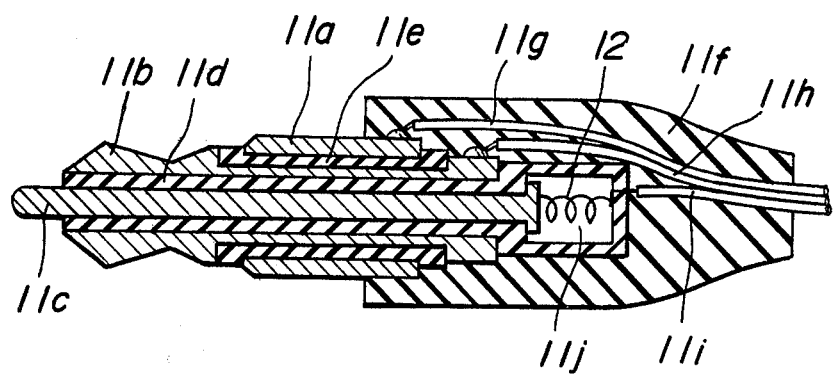
FIG. 4 is a vertical section view illustrating a plug member of the connecting device shown in FIG. 3.

FIG. 3 shows a connecting device for use in a connection of an external microphone of three terminal type as an external load. The connection device comprises a plug member 11 having a sleeve 11a, a tip 11b and a pin 11c. As shown in FIG. 4 the plug member 11 has the following construction. That is, the pin 11c is movably provided in the hollow cylindrical tip 11b through a hollow cylindrical insulator 11d. The tip end of the pin 11c is projected from the tip 11b by a predetermined length with the aid of bias force of an elastic member, for example, a spring 12 which is accommodated in a cavity 11j provided in the end portion of the insulator 11d. The sleeve 11a is provided around the tip 11b through a hollow cylindrical insulator 11e. Lead wires 11g, 11h and 11i are connected to the sleeve 11a, the tip 11b and the pin 11c, respectively. The end portion of these sleeve 11a, tip 11b, pin 11c, insulators 11d, 11e, and lead wires 11g, 11h and 11i and junction points thereof are enveloped by an insulating pinch 11f.

Figure 5A:
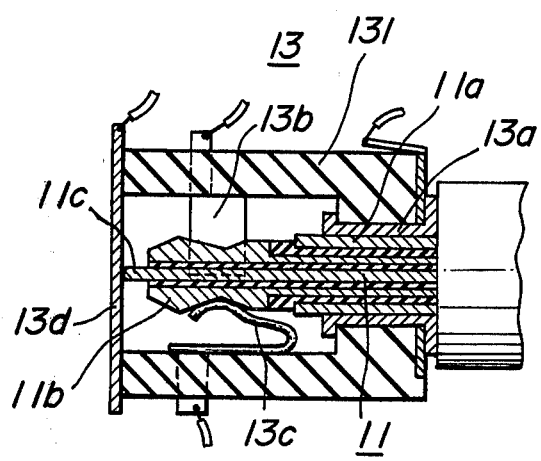
FIG. 5a is a vertical section view illustrating a jack member of the connecting device shown in FIG. 3 with the plug member inserted.
Figure 5B:
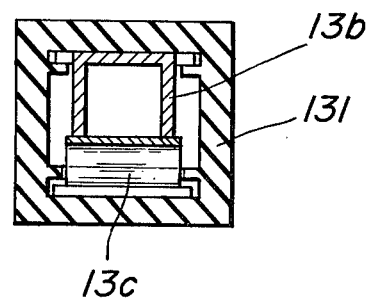

A jack member 13 has a contact segment 13a corresponding to the sleeve 11a of the plug member 11, switching contact member 13b, 13c corresponding to the tip 11b, and a contact segment 13d corresponding to the pin 11c. The construction of the jack member 13 is shown in FIG. 5a. That is, the contact segment 13a is mounted within an opening end portion of a jack body 131 and subjected to contact with the sleeve 11a. The contact segment 13d is provided at the end surface of the body 131 opposite to the opening end portion, and subjected to a contact to the pin 11c. Switching contact segments 13b, 13c are provided in the central portion of the jack body 131 and subjected to contact with the tip 11b. As shown in FIG. 5b, switching contact segments 13b and 13c are so construted that the contact segment 13b is fixed to the body 131, the contact segment 13c is secured to the body 131 movably with the aid of its elastic characteristic, and these contact segments 13b and 13c are normally closed with each other and opened by the tip 11b when inserting the plug member 11 into the jack member 13. Such inserting state is shown in FIG. 5a.

The sleeve 11a, the tip 11b and the pin 11c of the plug member 11 are connected to the external load, for example an external microphone 14 which requires a power supply source. The jack member 13 is provided on a housing of an electrical apparatus having a power supply source, for example, a tape recorder body. The contact segment 13a is connected to a built-in microphone 15 of the tape recorder and connected to a ground, the contact segment 13b is connected to the microphone 15 and connected to a power supply source +Vcc of the tape recorder through a resistor 16, the contact segment 13c is connected to an amplifier 17 of the tape recorder and the contact segment 13d is connected to the supply source +Vcc through a resistor 18.

The connecting device having above described construction operates as follows.

When the plug member 11 is not inserted in the jack member 13, switching contact segments 13b and 13c are closed to contact with each other. Then, the built-in microphone 15 of the tape recorder is connected to the supply source +Vcc and connected to the amplifier 17 through the contact segments 13b and 13c of the plug member 13 so that the sound signals generated from the microphone 15 are amplified in the amplifier 17 and supplied to a loudspeaker (not shown) of the tape recorder.

When the plug member 11 is inserted in the jack member 13, as shown in FIG. 5a the sleeve 11a of the plug member 11 is contacted to the contact segment 13a, the movable or elastic contact segment 13c is depressed by the tip 11b and released from contact with the fixed contact segment 13b, and the pin 11c is contacted to the contact segment 13d with a predetermined pressure by a bias force of the spring 12. In this case the tip 11b is separated from the fixed contact segment 13b with a slight gap because of the U-shaped configuration thereof as shown in FIG. 5b.

Under such condition the built-in microphone 15 is disconnected and the external microphone 14 is connected to the supply source +Vcc of the tape recorder through the pin 11c of the plug member 11 and the contact segment 13d of the jack member 13, and also connected to the amplifier 17 through the tip 11b of the plug member 11 and the movable contact segment 13c of the jack member 13 so that the sound signal from the external microphone 14 is supplied to the loudspeaker of the tape recorder through the amplifier 17.

According to such construction of the connecting device the supply voltage of the tape recorder can be supplied to the external microphone only by inserting the plug member into the jack member so that a separate power supply source which must be provided in the conventional external microphone can be omitted, and troublesome operations such as confirmations of the ON or OFF state of the power switch and the degree of power consumption of batteries can be omitted. Moreover, the external microphone can be decreased in weight due to omission of its own battery resulting in convenient handling. The auxiliary tip or the pin provided at the tip portion of the plug member can also be movable against the bias force of spring so that reliable contact pressure to the contact segment of the jack member can be obtained resulting in the security of a stable power supply. The plug member according to the present invention can be applied to the conventional jack shown in FIG. 1 without damaging the plug member even through a dustproof wall is provided at the inner portion of the conventional jack so that compatibility can be obtained.

Figure 6:
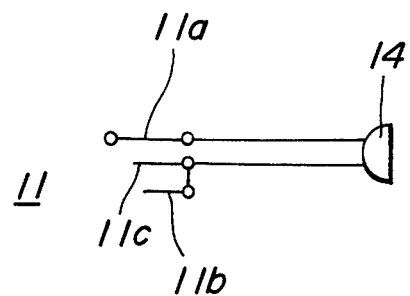
FIG. 6 is a circuit diagram showing another embodiment of a plug member of the connecting device according to the present invention.
Figure 7:
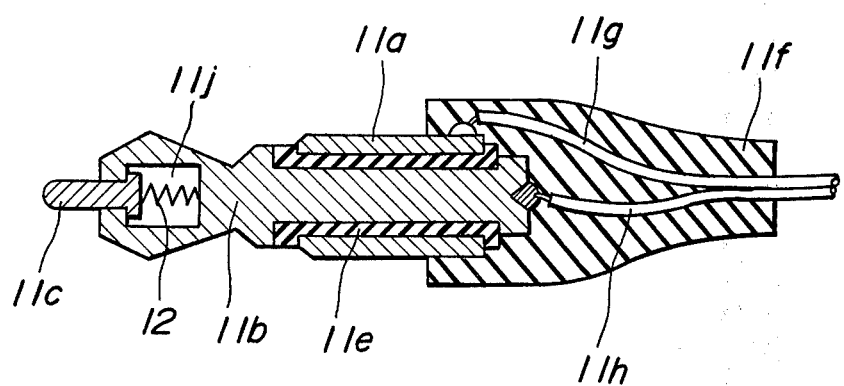
FIG. 7 is a vertical section view illustrating a plug member of the connecting device shown in FIG. 6.

It is further understood by those skilled in the art that the foregoing description is a preferred embodiment of the disclosed device, and the present invention is not limited thereto and that various changes and modifications may be made in the present invention without departing from the spirit and scope thereof. For example, in the above described embodiment a plug member for use in a three-terminal type microphone is described, but the present invention can also be applied to a plug member for use in a microphone of the two-terminal type in which the tip 11b and the pin 11c are short-circuited with each other as shown in FIG. 6. In this case the plug member 11 is so constructed that as shown in FIG. 7 a cavity 11j is formed in the end portion of the tip 11b, the pin 11c is movably provided in the end portion of the tip 11b, and the tip portion of the pin 11c is projected from the tip 11b by a predetermined length with the aid of bias force of the spring 12 which is accommodated in the cavity 11j. The other elements of the plug member are the same as that of the plug member shown in FIGS. 3 and 4 so that same advantageous effect can be obtained. In the above description a tape recorder as an electrical apparatus having a power supply source, and an external microphone as an external load requiring a power supply source are described, but the present invention can be applied to other apparatus so far as a load requiring a power supply source is concerned.

What is claimed is:

1. A connecting device comprising, a plug member arranged to be connected to an external load and including a conductive sleeve, a conductive tip extending out from within said conductive sleeve, a movable pin projecting from an end portion of the tip, and a jack member arranged to be mounted on a housing of an electrical apparatus and including a first contact segment for contacting with the conductive sleeve of the plug member, normally closed second and third switching contact segments arranged to separate from each other by action of the tip of the plug member wherein one of said second and said third contact segments electrically contacts the tip of the plug member, and a fourth contact segment for electrically contacting with the pin of the plug member to supply a source voltage from within the electrical apparatus to the external load through the pin of the plug member.

2. A connecting device as claimed in claim 1, wherein said conductive tip of said plug member is in the form of a hollow cylinder, a hollow cylindrical insulator is provided coaxially within the tip and has a cavity formed at one end portion of the insulator, a spring in the cavity, and a movable conductive pin projecting axially from the insulator wherein the pin is biased by the spring provided in the cavity.

3. A connecting device as claimed in claim 1, wherein the plug member comprises a conductive tip having a cavity within one end portion thereof, a spring in the cavity, and a movable conductive pin projecting axially from the tip wherein the pin is biased by the spring provided in the cavity and the tip and the pin are short circuited with each other.

4. A connecting device as claimed in claim 1, including a condenser microphone connected to the plug member to provide the external load.

5. A connecting device as claimed in claim 4, wherein the condenser microphone is connected to the plug member so that signals from the microphone are conducted through the conductive sleeve and the conductive tip of the plug member.

* * * * *